(12) United States Patent
Agersborg et al.

(10) Patent No.: US 10,989,616 B2
(45) Date of Patent: Apr. 27, 2021

(54) DEVICE AND SYSTEM FOR PERFORMING MEASUREMENTS ON A SEABED

(71) Applicant: GRAVITUDE AS, Bergen (NO)

(72) Inventors: Remy Agersborg, Straumsgrend (NO); Bjarte Fagerås, Fana (NO); Martin Vatshelle, Kalandseidet (NO); Hugo Ruiz, Nesttun (NO); Lars Hille, Nesttun (NO); Trond Espedal, Fyllingsdalen (NO); John Even Lindgård, Harstad (NO); Yngve Rusås, Laksevåg (NO)

(73) Assignee: GRAVITUDE AS, Bergen (NO)

( * ) Notice: Subject to any disclaimer, the term of this patent is extended or adjusted under 35 U.S.C. 154(b) by 569 days.

(21) Appl. No.: 16/063,767

(22) PCT Filed: Dec. 20, 2016

(86) PCT No.: PCT/NO2016/050263
§ 371 (c)(1),
(2) Date: Jun. 19, 2018

(87) PCT Pub. No.: WO2017/111611
PCT Pub. Date: Jun. 29, 2017

(65) Prior Publication Data
US 2020/0264063 A1    Aug. 20, 2020

(30) Foreign Application Priority Data
Dec. 24, 2015  (NO) .................................. 20151797

(51) Int. Cl.
*B63G 8/00* (2006.01)
*G01L 19/00* (2006.01)
*G01L 19/04* (2006.01)

(52) U.S. Cl.
CPC .............. *G01L 19/04* (2013.01); *B63G 8/001* (2013.01); *G01L 19/0092* (2013.01); *B63G 2008/002* (2013.01)

(58) Field of Classification Search
CPC ..... G01L 19/04; G01L 19/0092; B63G 8/001; B63G 2008/002; G01V 1/186; G01V 1/162; G01V 7/00; G01V 7/16; G01V 7/02
See application file for complete search history.

(56) References Cited

U.S. PATENT DOCUMENTS

| 7,196,535 B2 | 3/2007 | Fenk |
| 7,637,168 B2 | 12/2009 | Charette |

(Continued)

OTHER PUBLICATIONS

Peer Fietzek, "In situ Quality Assessment of a Novel Underwater pCO2 Sensor Base on Membrane Equilibration and NDIR Spectrometry" Jan. 2014, American Meteorological Society (Year: 2014).*

(Continued)

*Primary Examiner* — Anthony D Wiest
(74) *Attorney, Agent, or Firm* — Jeffrey S. Melcher; Melcher Patent Law PLLC

(57) ABSTRACT

A device (110) for performing measurements on a seabed (3), comprises a chamber (111) containing a sensor (120) and a fluid (115) at a constant temperature and at an ambient pressure. This removes the need for calibration in large ranges of both pressure and temperature. In addition, this eliminates the need to wait until the sensor (120) has achieved ambient temperature, and thereby achieves a desired accuracy of the recordings from the sensor while decreasing the operation time. The device preferably comprises an insulating layer (113), an internal temperature stabilising device (130) and a circulating device (131) to ensure a constant temperature and low temperature gradients (Continued)

within the chamber (111). The pressure within chamber (111) may be equalised to ambient pressure by a pressure inlet (112).

10 Claims, 1 Drawing Sheet

(56) References Cited

U.S. PATENT DOCUMENTS

| | | |
|---|---|---|
| 10,732,064 B2 * | 8/2020 | Looijen ............... G01L 19/0038 |
| 2002/0135377 A1 | 9/2002 | Farruggia |
| 2010/0153050 A1 | 6/2010 | Zumberge |

OTHER PUBLICATIONS

International Search Report issued in PCT/NO2016/050263, dated Mar. 17, 2017, pp. 1-2.
Written Opnion issued in PCT/NO2016/050263, dated Mar. 17, 2017, pp. 1-8.
Norwegian Search Report issued in Norwegian patent application No. 20151797, dated Jun. 8, 2016, pp. 1-2.

* cited by examiner

DEVICE AND SYSTEM FOR PERFORMING MEASUREMENTS ON A SEABED

BACKGROUND

Field of the Invention

The present invention concerns a device and system for performing measurements on a seabed.

Prior and Related Art

Some sensors used for precise measurements on a seabed are sensitive to ambient temperature, Examples include sensitive instruments for measuring pressure and gravity.

During a survey, such instruments are moved between different locations on the seabed by means of a surface vessel and/or a subsea vehicle such as an AUV or an ROV. In the following, 'ambient' pressure and temperature is the specific pressure and temperature at each such location on the seabed. In order to obtain accurate measurements, the instruments must be allowed to achieve ambient temperature at each location. Temperature stabilisation may add hours to each measurement, and has a significant impact on the time required for measuring at tens or hundreds of locations during a survey. In turn, this adds to the cost of the survey, e.g. due to the price for hiring a survey vessel with an ROV and trained operators.

In addition, calibrating sensors in the large ranges of temperature and pressure found in the seabed is unpractical. Keeping a reasonably small number of both measurements and parameters in the calibration functions results into a limitation in the accuracy of the calibration.

The objective of this invention is to solve or reduce these and other problems while retaining the benefits of prior art.

SUMMARY OF THE INVENTION

This is achieved by a device according to claim 1 and a system according to claim 6. Further features and benefits appear from the dependent claims.

In particular, the invention concerns a device for performing measurements on a seabed, comprising a chamber containing at least one sensor and a fluid at a constant temperature and at an ambient pressure. This removes the need for calibration in large ranges of both pressure and temperature. In addition, this eliminates the need to wait for temperature stabilisation, and thereby achieves the desired accuracy of the recordings from the sensor while decreasing the operation time.

The device advantageously further comprises an insulating layer around the chamber. This will protect the internal fluid from rapid temperature changes influenced by the ambient temperature, and decrease the requirements for active heating or cooling elements within the chamber.

The device may further comprise an internal temperature stabilising device. This is an active device for controlling the temperature inside the chamber and thereby increase the accuracy of recordings made by the sensor.

The internal temperature stabilising device may further comprise a circulating device to ensure even temperature, i.e. a minimal temperature gradient, within the entire chamber.

The device may further comprise an inlet for ambient pressure. The inlet provides an opening to the ambient pressure and is one way of ensuring that the fluid within the chamber is kept at ambient pressure. Alternatives include a membrane, a piston or any other means known in the art to equalise the pressure within the chamber to ambient pressure.

The invention also concerns a system comprising the device, a surface vessel and a means for lowering the device to the seabed.

The system may include an umbilical or any other means for recording and/or transmitting data from the sensor.

BRIEF DESCRIPTION OF THE DRAWINGS

The invention will be explained with reference to exemplary embodiments and the accompanying drawings, in which.

DETAILED DESCRIPTION OF A PREFERRED EMBODIMENT

The drawings are schematic and not necessarily to scale. For ease of understanding, numerous details known to the skilled person are omitted from the drawings and following description. In the claims, the terms "a", "an" and "the" should be construed as "at least one", whereas "one" means exactly one.

Figure 1:
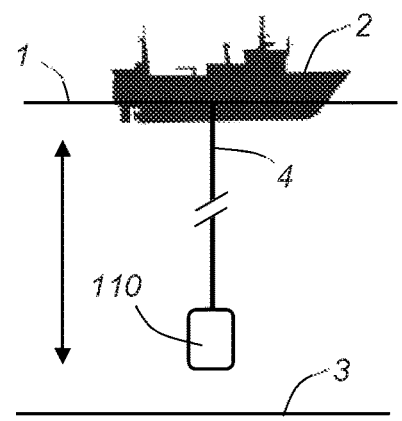
FIG. 1 illustrates a principle of the invention

FIG. 1 illustrates a deployment system 100 with a surface vessel 2 at a sea surface 1 deploying or retrieving a device 110 through the water column to/or from a seabed 3. In FIG. 1, conveying means 4 illustrates any means for deploying and moving the device 110 on the seabed 3, and for retrieving the device 110 from the seabed 3. The conveying means 4 may include an umbilical or similar for transmitting signals from and supplying power to the device 110. If desired, a real embodiment may include an AUV, an ROV and any other tool for deploying, moving or retrieving the device 110.

Figure 2:
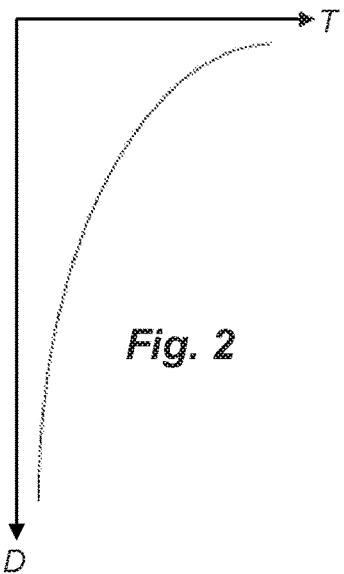
FIG. 2 illustrates a temperature variation versus depth

FIG. 2 illustrates a temperature variation in the water column. The temperature typically decreases with increasing depth. The temperature variation in the water column will influence the sensor recordings at different depths, and may cause a need for temperature stabilisation of a sensor 120 before it can start recording on a specific depth.

Figure 3:
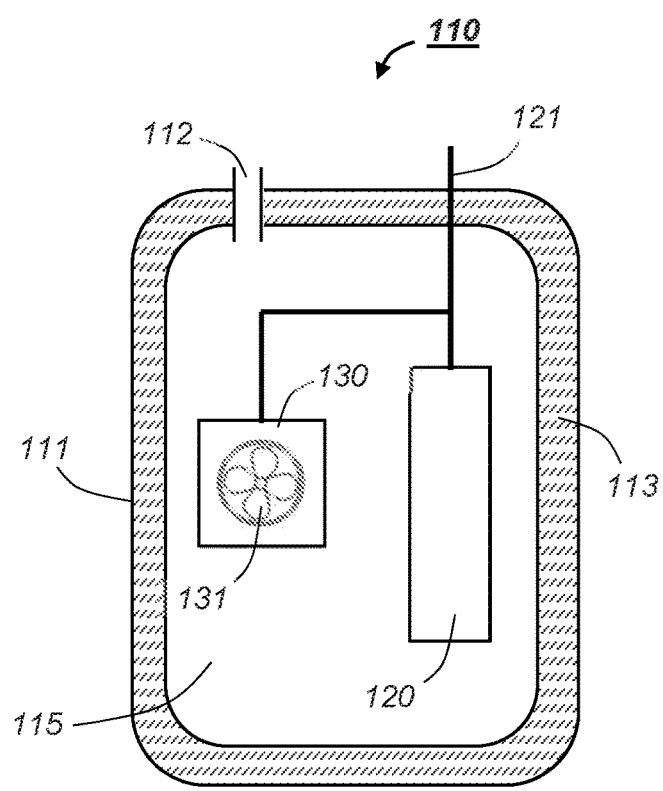
FIG. 3 illustrates a device according to the invention.

FIG. 3 shows a chamber 111 with an insulating layer 113. The chamber 111 is filled with a fluid 115 at constant temperature. Inside the chamber 111 is a temperature stabilising device 130 for keeping the temperature stable inside the chamber 111 throughout the operation. The temperature stabilising device 130 may further comprise a circulation device 131 to ensure a minimal temperature gradient within the chamber 111.

At the top of the chamber 111 there is one or more inlets for external fluid/pressure 112. The sensor is illustrated by 120 and a means for transferring the recordings is illustrated by a cable 121. The cable 121 is optional as the recordings could be transmitted over a wireless link or stored locally.

The inlet(s) 112 can be placed in any of the walls of the chamber, and the system may include additional devices in place to prevent fluid drainage from the chamber 111 during the time the device is out of the water.

Alternatively, the inlet(s) can have the form of a tube or a cavity and connect outside water with the pressure inlet of the sensor 120. They can be filled in with water or any other fluid.

Thus, as the sensor 120 is exposed to ambient pressure but remains at constant temperature, the needs to wait for temperature stabilisation and for 2-dimensional temperature-pressure calibration of the sensor 120 is eliminated.

While the invention has been described by means of example and schematic drawings, the full scope of the invention is defined by the accompanying claims.

The invention claimed is:

1. A device for performing measurements on a seabed, comprising:
    a chamber containing a sensor and a fluid at a constant temperature;
    an insulating layer around the chamber; and
    an internal temperature stabilising device, wherein the fluid has an ambient pressure, the device comprises an inlet for ambient pressure, and the internal temperature stabilising device comprises a circulating device.

2. The device according to claim 1, wherein the inlet for ambient pressure includes a membrane.

3. The device according to claim 1, wherein the inlet for ambient pressure includes a piston.

4. The device according to claim 1, wherein the chamber comprises walls and the inlet is placed in any of the walls of the chamber.

5. The device according to claim 4, comprising additional devices in place to prevent fluid drainage from the chamber during time the device is out of the water.

6. The device according to claim 1, wherein the inlet has the form of a tube or a cavity and connects outside water with the pressure inlet of the sensor.

7. The device according to claim 6, wherein the device can be filled with water or any other fluid.

8. The device according to claim 1, wherein the device is conveyed by a surface vessel and comprises conveying means for conveying the device between the surface vessel and seabed.

9. The device according to claim 8, wherein the conveying means includes an umbilical.

10. The device according to claim 8, wherein the conveying means includes an AUV, an ROV, or any other tool for deploying, moving or retrieving the device.

* * * * *